United States Patent
Todd et al.

(10) Patent No.: US 11,360,703 B2
(45) Date of Patent: Jun. 14, 2022

(54) METHOD AND SYSTEM FOR A TRUSTED ACTUATION VIA DATA FABRIC METADATA

(71) Applicant: EMC IP Holding Company LLC, Hopkinton, MA (US)

(72) Inventors: Stephen James Todd, North Conway, NH (US); Trevor Scott Conn, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 16/660,009

(22) Filed: Oct. 22, 2019

(65) Prior Publication Data

US 2021/0117128 A1 Apr. 22, 2021

(51) Int. Cl.
*G06F 3/06* (2006.01)
*G06F 16/28* (2019.01)

(52) U.S. Cl.
CPC .......... *G06F 3/0659* (2013.01); *G06F 3/0604* (2013.01); *G06F 3/0673* (2013.01); *G06F 16/289* (2019.01)

(58) Field of Classification Search
CPC .............................. G06F 3/0659; G06F 3/0604
See application file for complete search history.

(56) References Cited

U.S. PATENT DOCUMENTS

| | | | |
|---|---|---|---|
| 8,474,032 B2 * | 6/2013 | Fetik | H04L 63/0209 726/11 |
| 8,959,070 B2 | 2/2015 | Elbaz | |
| 2005/0257045 A1 | 11/2005 | Bushman | |
| 2005/0277403 A1 | 12/2005 | Schmidt | |
| 2015/0363109 A1 * | 12/2015 | Frick | G06F 3/0658 711/112 |
| 2017/0168730 A1 * | 6/2017 | Chiu | G06F 3/0613 |
| 2020/0274713 A1 | 8/2020 | Li | |

* cited by examiner

*Primary Examiner* — Edward J Dudek, Jr.
(74) *Attorney, Agent, or Firm* — Chamberlain, Hrdlicka, White, Williams & Aughtry

(57) ABSTRACT

A method for managing data includes obtaining, by a local data manager, an actuation command request, performing a metadata analysis on confidence metadata associated with the actuation command request, making a determination that the actuation command request is valid, and in response to the determination, sending an actuation command to an actuation device based on the actuation command request.

20 Claims, 11 Drawing Sheets

US 11,360,703 B2

METHOD AND SYSTEM FOR A TRUSTED ACTUATION VIA DATA FABRIC METADATA

BACKGROUND

Systems may be configured to receive requests from multiple devices.

Traditional approaches to processing such requests do not take into account the events that triggered the issuance of the request.

SUMMARY

In general, in one aspect, the invention relates to a method for managing data. The method includes obtaining, by a local data manager, an actuation command request, performing a metadata analysis on confidence metadata associated with the actuation command request, making a determination that the actuation command request is valid, and in response to the determination, sending an actuation command to an actuation device based on the actuation command request.

In general, in one aspect, the invention relates to non-transitory computer readable medium that includes computer readable program code, which when executed by a computer processor enables the computer processor to perform a method for managing data. The method includes obtaining, by a local data manager, an actuation command request, performing a metadata analysis on confidence metadata associated with the actuation command request, making a determination that the actuation command request is valid, and in response to the determination, sending an actuation command to an actuation device based on the actuation command request.

In general, in one aspect, the invention relates to a system that includes a processor and memory that includes instructions, which when executed by the processor, perform a method for managing data. The method includes obtaining, by a local data manager, an actuation command request, performing a metadata analysis on confidence metadata associated with the actuation command request, making a determination that the actuation command request is valid, and in response to the determination, sending an actuation command to an actuation device based on the actuation command request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
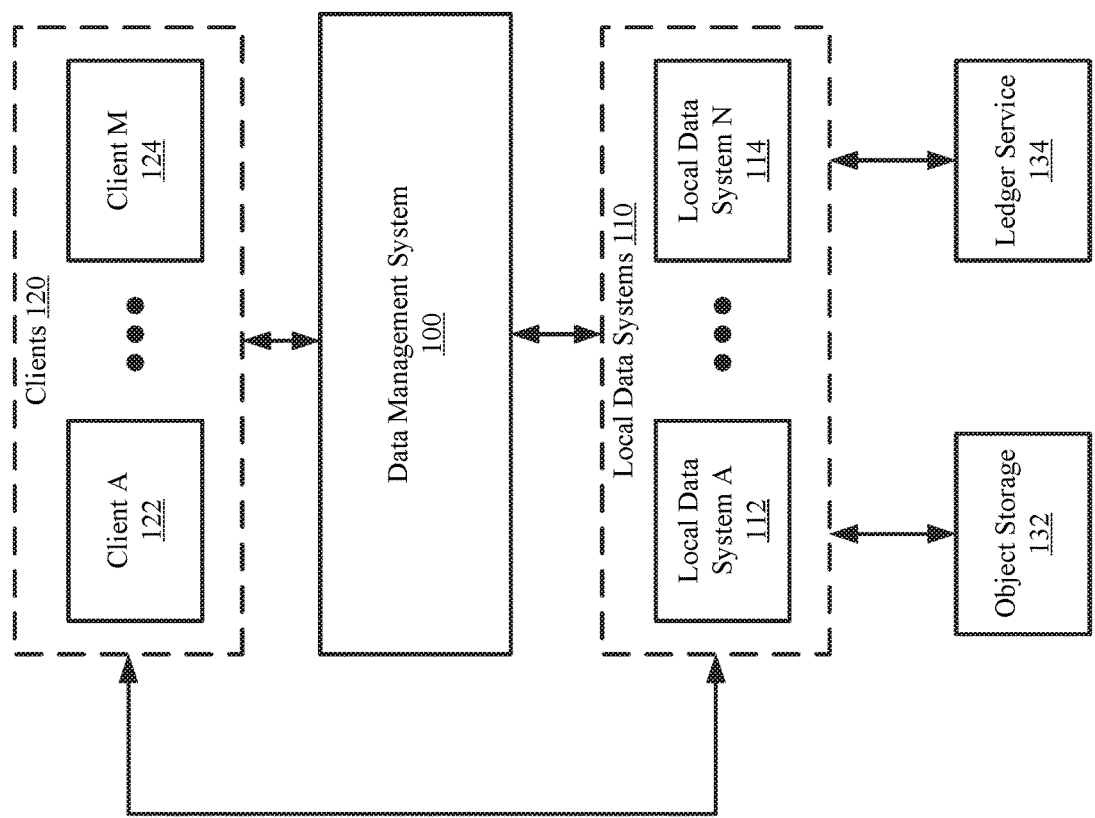
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing local data systems. More specifically, embodiments of the invention include processing the data obtained from a local data source in accordance with data confidence fabric (DCF) pipelines and monitoring the obtained data to determine whether actuation commands are to be issued to actuation devices associated with the local data source. The determination may be made based on at least the content of the data set.

Embodiments of the invention may process the actuation command requests by performing a metadata analysis on confidence metadata associated with the actuation command request. This may allow a device pass-through service processing the actuation command requests to verify that an actuation command request is valid. For example, the device pass-through service may identify a confidence metadata criterion (criteria) required to perform an actuation command and verify that the confidence metadata associated with the actuation command meets the criterion (criteria).

Further, the process may include verifying that the data set that is used to justify the actuation command request is valid. For example, the confidence metadata may specify information about how the data set was obtained, whether there is an owner of the data set, the actuation device (or other local data source) that provided the data set, and/or any other information. This information may be used to verify the reliability of the data set in order confirm the validity of the actuation command request. In this manner, embodiments of the invention reduce the amount of actuation commands that are issued, for example, from malicious entities without verification and/or from device pass-through services that do not verify the reliability of the data sets used to justify an actuation command.

FIG. 1A shows a diagram of a system in accordance with one or more embodiments of the invention. The system includes a data management system (100), local data systems (110), clients (120), an object storage (132), and a ledger service (134). Each component of the system may be operably connected via any combination of wired and/or wireless connections. The system may include additional, fewer, and/or different components without departing from the invention. Each component of the system illustrated in FIG. 1A is discussed below.

In one or more embodiments of the invention, the data management system (100) manages a data confidence fabric. In one or more embodiments of the invention, a data confidence fabric (DCF) is a logical grouping of computing devices configured to store data and provide data to clients (120). In one or more embodiments of the invention, the local data systems (110) are part of the DCF.

In one or more embodiments of the invention, the data management system (100) manages the DCF by configuring computing devices associated with the DCF to store data and/or provide data in a way that is requested by the clients (120). The data management system (100) may communicate with the clients (120) by providing the client a set of options for configuring the DCF computing devices (e.g., the local data systems (110)). The data management system may be further equipped to deploy configurations based on a selection of configuration options selected by the clients (120). For additional details regarding the configuration management of the data management system (100), see, e.g., FIG. 2A.

Figure 4:
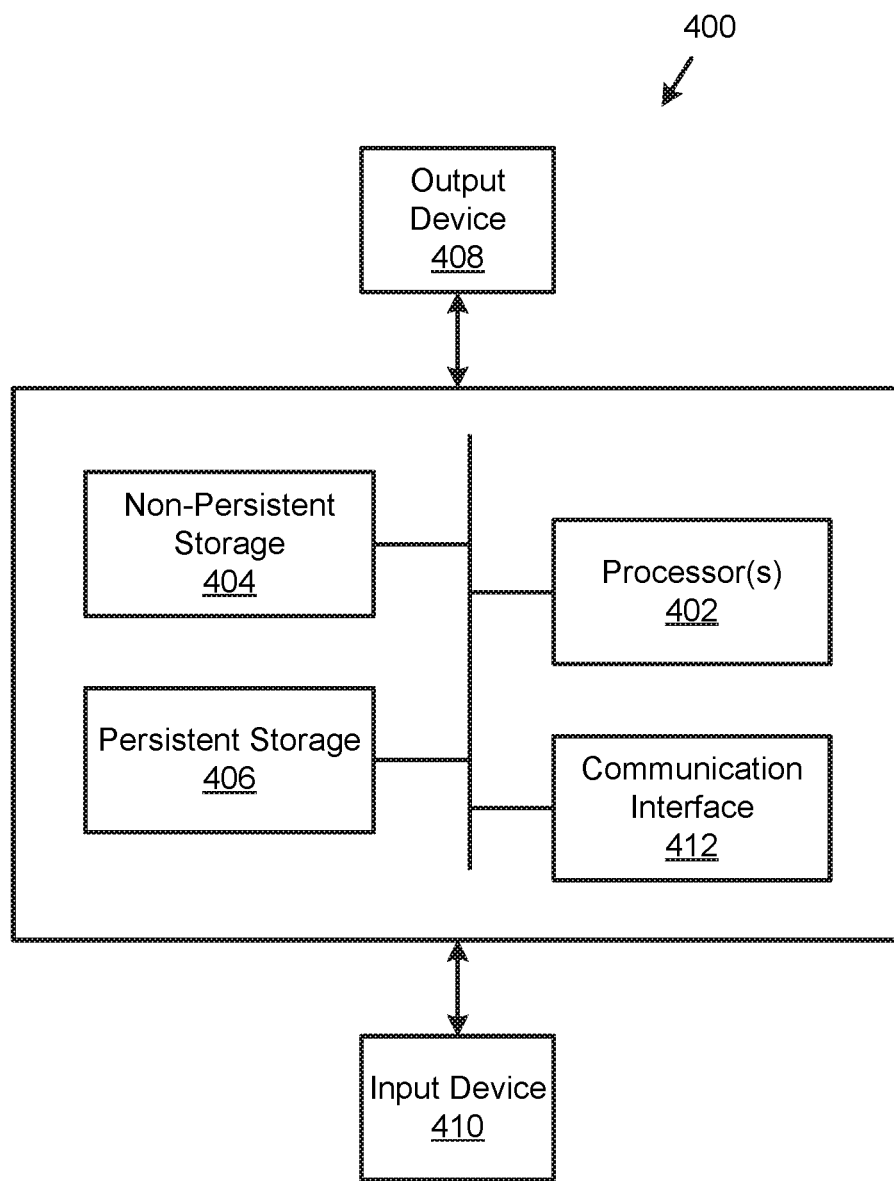
FIG. 4 shows a diagram of a computing device in accordance with one or more embodiments of the invention.

In one or more embodiments of the invention, the data management system (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data management system (100) described in this application and/or all, or portion, of the methods illustrated in FIG. 2A.

The data management system (100) may be implemented as a logical device without departing from the invention. The logical device utilizes computing resources of any number of physical computing devices to provide the functionality of the data management system (100) described throughout this application and/or all, or portion, of the methods illustrated in FIG. 2A. For additional details regarding the data management system, see, e.g., FIG. 1B.

In one or more embodiments of the invention, the local data systems (110) are systems associated with a DCF that obtains data, stores data, provides data, and/or execute applications based on the stored data. The local data systems (110) may provide the stored data and/or applications to the clients (120) as specified by terms agreed to by the clients (120) based on transactions between the clients (120) and the local data systems (110).

In one or more embodiments of the invention, computing devices executing within the local data systems (110) may be associated with the DCF. In this manner, the data management system (100) may include functionality to configure one or more computing devices of the local data systems (110) to obtain, modify, and/or store data in accordance with the DCF.

In one or more embodiments of the invention, each local data system (110) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the local data system (110) described throughout this application and/or all, or portion, of the method illustrated in FIGS. 2B-2C.

A local data system (112, 114) may be implemented as a logical device without departing from the invention. The logical device utilizes computing resources of any number of physical computing devices to provide the functionality of the local data system (112, 114) described throughout this application and/or all, or portion, of the method illustrated in FIGS. 2B-2C. For additional details regarding a local data system (112, 114), see, e.g., FIG. 1B.

In one or more embodiments of the invention, the clients (120) may utilize computing resources and/or access data of the local data systems (110). The clients (120) may further communicate with the data management system (100) to select configuration options for configuring computing devices of the local data systems (110) and provide the options to the data management system (100).

Additionally, clients (120) may generate and send actuation command requests for actuation devices operating on the local data systems (110). The client may send an actuation command request to a local data system (112, 114), where the actuation command request specifies one or more modifications to the behavior of an actuation device operating in the local data system (112, 114). The clients (120) (which may in some cases be operating in a malicious manner, e.g., when they have been compromised by a malicious third-party) may initiate the generation and sending of actuation command requests based on data obtained from the local data systems (110), based on malicious intent (i.e., for the purpose of harming the local data system (112, 114)), and/or based on any other event without departing from the invention.

In one or more embodiments of the invention, each client (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application.

In one or more embodiments of the invention, an object storage (132) is a service that stores data and, optionally, metadata obtained from the local data systems (110). The object storage (132) may be equipped to store immutable entries (i.e., entries that cannot be modified or deleted), where each entry includes an object data identifier of the data and/or additional metadata of the data. The object data identifier may be a unique identifier generated by performing a function (e.g., a hash function) on an obtained data set (or a portion thereof) to obtain a unique value (i.e., the object data identifier). The object storage (132) may be internal or external to a local data system (112, 114) without departing from the invention.

In one or more embodiments of the invention, the additional metadata of an entry may specify additional information about a data set such as, for example, an owner of the data set, a geographical location of the data set, and/or other information associated with the data set without departing from the invention.

In one or more embodiments of the invention, the object storage (132) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the object storage (132) described throughout this application.

In one or more embodiments of the invention, the object storage (132) is implemented as a logical device. The logical device may utilize computing resources of any number of physical computing devices to provide the functionality of the object storage (132) described throughout this application.

In one or more embodiments of the invention, a ledger service (134) is a service that stores data and/or metadata obtained from the local data systems (110). The ledger service (134) may be equipped to store immutable entries, where each entry includes a data set and/or the metadata of the data. The ledger service may be internal or external to a local data system (112, 114) without departing from the invention. In scenarios in which the entries do not include the data (or where the data is otherwise not stored in the ledger service), the entries may include a reference to the data (e.g., a reference to a location in the object storage and/or a reference to a location in the local data manager).

The ledger service may differ from the object storage (132) in that the ledger service (134) is equipped to implement security measures for the immutable entries. The security measures may include, for example, using private key decryption, peer validation (e.g., using third-party computing devices to validate the entries), etc. Other security measures may be implemented on the immutable entries of the ledger service (134) without departing from the invention.

The ledger service (134) may further differ from the object storage (132) by storing a limited amount of data. Said another way, each entry of the ledger service (134) may use less data than the object storage such that the total amount of data stored in the ledger service (134) is less than that of the object storage (132). For example, an entry of the ledger service (134) may store a hash value of the data stored in an entry of the object storage (132).

In one or more embodiments of the invention, the ledger service (134) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the ledger service (134) described throughout this application.

In one or more embodiments of the invention, the ledger service (134) is implemented as a logical device. The logical device may utilize computing resources of any number of physical computing devices to provide the functionality of the ledger service (134) described throughout this application.

In one or more embodiments of the invention, the ledger service (134) is implemented as a distributed ledger (e.g., a blockchain). The logical device may utilize computing resources of any number of physical computing devices to provide the functionality of the ledger service (134) described throughout this application.

Figure 1B:
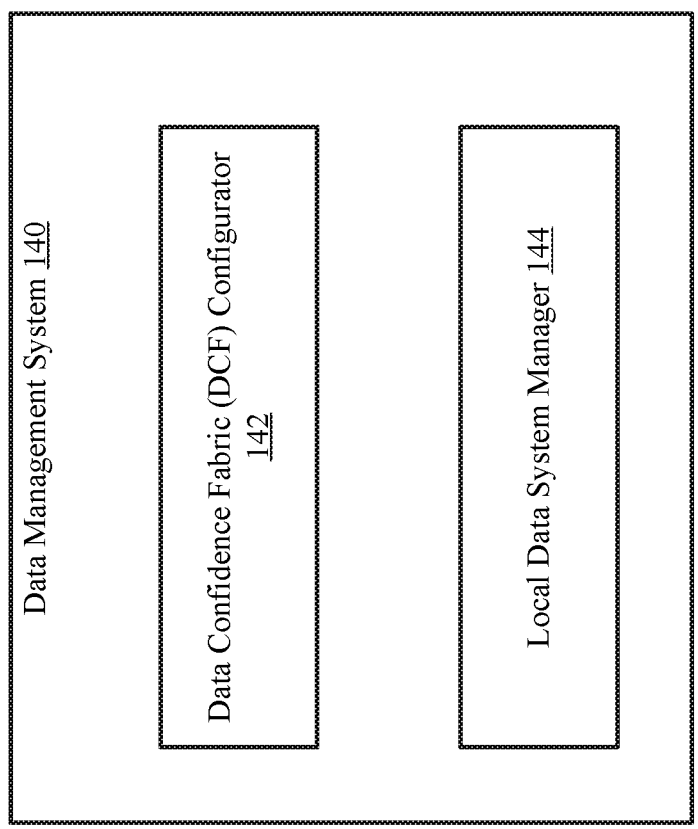
FIG. 1B shows a diagram of a data management system in accordance with one or more embodiments of the invention.

FIG. 1B shows a diagram of a data management system in accordance with one or more embodiments of the invention. The data management system (140) may be an embodiment of the data management system (100, FIG. 1A) discussed above. As discussed above, the data management system (140) communicates with clients to obtain a selection of configuration options and uses the selection to generate DCF configuration files to be deployed to one or more local data systems.

To perform the aforementioned functionality, the data management system (140) includes a DCF configurator (142) and a local data system manager (144). The DCF configurator (142) and a local data system manager (144) may be operably connected via any combination of wired and/or wireless networks without departing from the invention. The data management system (140) may include additional, fewer, and/or different components without departing from the invention. Each of the aforementioned components is discussed below.

In one or more embodiments of the invention, the DCF configurator (142) communicates with the clients to present options for configuring one or more local data systems. The options may be presented via a graphical user interface (GUI). The DCF configurator may send the options to the client to be displayed by the GUI operating in the client.

In one or more embodiments of the invention, the options (also referred to as configuration options) specify configurations to be implemented on local data managers of the local data systems. The configurations may specify options for augmenting unprocessed data and/or modifying the unprocessed data to generate processed data, and/or options for storing the data (either processed data or unprocessed data). The configurations may be associated with a DCF pipeline in which the data is obtained and/or stored. In one or more embodiments of the invention, a DCF pipeline is a process (which may include multiple processing steps) to be performed by a local data manager when obtaining and/or storing unprocessed data.

In one or more embodiments of the invention, the GUI may specify options for augmenting the unprocessed data. In one or more embodiments of the invention, the unprocessed data is augmented by generating additional data (also referred to as confidence metadata) to be embedded in the unprocessed data prior to storage and/or stored separately from the unprocessed data. The additional data may be, for example, metadata, digital signatures, identification information, etc.

In one or more embodiments of the invention, the metadata includes characteristics that may be useful to a computing device obtaining the data to determine a reliability of the data. The characteristics may include, for example, a data set identifier (e.g., a combination of letters, characters, and/or numbers that uniquely identify the processed or unprocessed data), a geographical location associated with the data (i.e., from what location the data set was obtained), a type of data (e.g., temperature measurements, recorded video, speedometer data, etc.), a data source identifier (e.g., a combination of letters, characters, and/or numbers that uniquely identify a local data source from which the unprocessed data was obtained), a confidence score, etc. A client may specify, using the GUI, which, if any, of the characteristics should be generated and/or embedded into (or otherwise associated with) the unprocessed data.

In one or more embodiments of the invention, the identification information specifies ownership of the data. The owner of the data may be a legal entity that has the right to store, obtain, use, and/or profit from the data. A legal entity may be a person, a group of people, a partnership, corporation, any other business entity, or any combination thereof. The client may specify, using the GUI, whether the identification information should be generated and/or embedded into (or otherwise associated with) the unprocessed data.

In one or more embodiments of the invention, a digital signature of unprocessed data is data that is generated using a private key and the unprocessed data. The digital signature may be generated, for example, by performing a function (e.g., a hash function) on the unprocessed data to generate a value, and performing a secondary function (e.g., encryption) on the value using the private key. The client may specify, using the GUI, whether a digital signature should be generated and/or embedded into (or otherwise associated with) the unprocessed data.

In one or more embodiments of the invention, a confidence score of a data set is a numerical representation, e.g., a percentage, of a quality of the data set. A high confidence score may represent a local data set with a high quality and/or trustworthiness. Conversely, a low confidence score may represent a local data set with a low quality and/or trustworthiness. The quality of a local data set may reflect a usefulness and/or a reliability of the local data set. Said another way, the quality of the data set may reflect how much a client may rely on this data within the data set. If the data is high quality, then the results generated using the data set may be considered to be more accurate and/or reliable when compared with results generated using data that is determined to be of lower quality (quantified by the confidence score) or of no quality (e.g., no confidence metadata is generated for the data). The confidence score of the data set may be calculated and/or otherwise obtained based on: (i) metadata associated with the data set, (ii) an assignment of the owner of the data set, and/or (iii) where the data is stored (e.g., data stored in an immutable ledger service is associated with a higher score than data stored in a persistent storage of a high-network traffic device). The confidence score may be obtained based on other metrics without departing from the invention.

In one or more embodiments of the invention, the GUI specifies options for modifying the unprocessed data. The data may be modified by, for example, performing an encryption and/or performing compression on the unprocessed or processed data prior to storing the data. In one or more embodiments of the invention, performing compression on unprocessed data includes applying a compression algorithm on the unprocessed data to generate processed data such that the processed data includes less data than the unprocessed data. The client may specify, using the GUI, whether to modify the data prior to storage and/or the type of modification to perform (e.g., encryption, compression, etc.).

In one or more embodiments of the invention, the GUI specifies options for storing the data. The data may be stored internally in the local data system (e.g., in a persistent storage of the local data manager) and/or externally. For example, the data (processed or unprocessed) may be replicated and stored in a ledger service. In such embodiments, the data (processed or unprocessed) may be stored by generating a ledger entry and storing the data and/or any metadata associated with the data in the ledger entry to be stored in the ledger service. The metadata associated with the data (processed or unprocessed) may further be stored in an object storage. The ledger entry may be used by, e.g., clients for auditing purposes.

In one or more embodiments of the invention, the client specifies, using the GUI, options for storing the processed or unprocessed data and/or any metadata associated with the processed or unprocessed data. The options may include storing the data in a ledger service and/or storing the metadata (if any) in an object storage.

The invention is not limited to aforementioned options from which the user may select via a GUI. Moreover, while the options may be selected using a GUI, the options may be selected using any other selection mechanism (now or later discovered) without departing from the invention.

In one or more embodiments of the invention, the DCF configurator (142) generates a DCF configuration file based on the selection of options obtained from the client. For additional details regarding the generation of the DCF configuration file, see, e.g., FIG. 2A.

In one or more embodiments of the invention, DCF configurator (142) is a hardware device including circuitry. The DCF configurator (142) may be, for example, a digital signal processor, a field programmable gate array, or an application specific integrated circuit. The DCF configurator (142) may be other types of hardware devices without departing from the invention.

In one or more embodiments of the invention, the DCF configurator (142) is implemented as computing code stored on a persistent storage that when executed by a processor of the data management system (140) performs the functionality of the DCF configurator (142). The processor may be a hardware processor including circuitry such as, for example, a central processing unit or a microcontroller. The processor may be other types of hardware devices for processing digital information without departing from the invention.

In one or more embodiments of the invention, the local data system manager (144) interfaces with local data systems to configure one or more local data systems. Specifically, the local data system manager (144) deploys DCF configuration files generated by the DCF configurator (142). The local data system manager (144) may identify the local data managers to which to send the DCF configuration files and subsequently send the DCF configuration files to the identified local data managers.

In one or more embodiments of the invention, local data system manager (144) is a hardware device including circuitry. The local data system manager (144) may be, for example, a digital signal processor, a field programmable gate array, or an application specific integrated circuit. The local data system manager (144) may be other types of hardware devices without departing from the invention.

In one or more embodiments of the invention, the local data system manager (144) is implemented as computing code stored on a persistent storage that when executed by a processor of the data management system (140) performs the functionality of the local data system manager (144). The processor may be a hardware processor including circuitry such as, for example, a central processing unit or a microcontroller. The processor may be other types of hardware devices for processing digital information without departing from the invention.

Figure 1C:
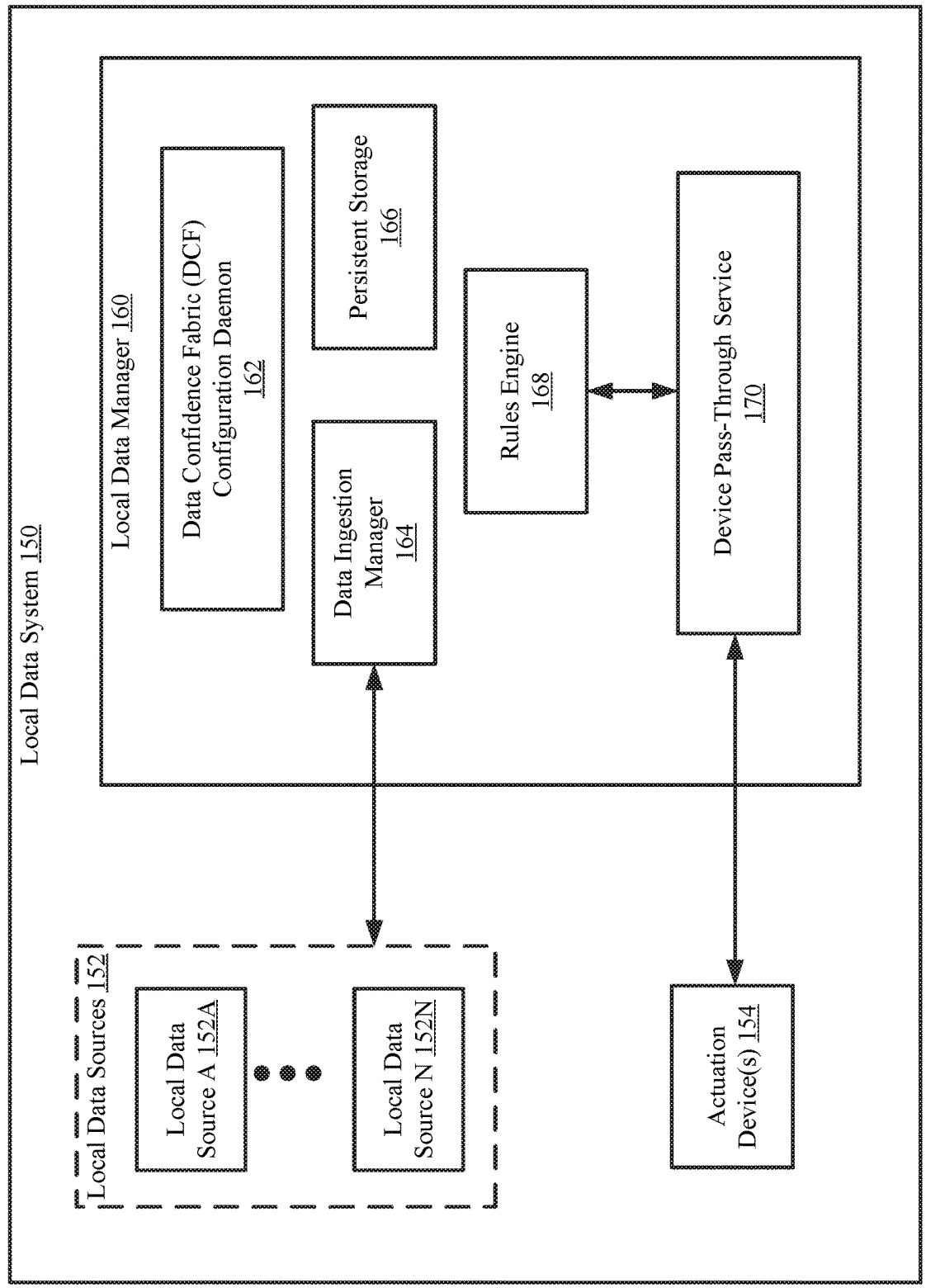
FIG. 1C shows a diagram of a local data system in accordance with one or more embodiments of the invention.

FIG. 1C shows a diagram of a local data system in accordance with one or more embodiments of the invention. The local data system (150) may be similar to a local data system (112, 114, FIG. 1A) discussed above. The local data system (150) may include local data sources (152), actuation device(s) (154), and a local data manager (160). The local data system (150) may include additional, fewer, and/or different components without departing from the invention. Each component of the local data system (150) illustrated in FIG. 1B is discussed below.

In one or more embodiments of the invention, the local data sources (152) are sources of data obtained from real-world processes. A data source may be, for example, a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the local data sources (152A, 152N) is an Internet-of-things (IOT) device. For example, one of the data sources (152A) may be a camera operably connected to the Internet and that supplies data via an IOT standard to the local data manager (160). The data may be a video stream of a particular location. Image recognition may be utilized to extract relevant information from the video stream. The relevant information may be supplied to the local data manager (160) in isolation or in combination with the video stream itself.

In one or more embodiments of the invention, the actuation devices (154) perform or initiate operations such as electrical operations, mechanical operations, etc. The operations may include, for example, rotation of a motor, initiating the cooling and/or heating a device, movement of robotic arm, turning on or off a given electrical device, starting or stopping a process, and/or any other operation without departing from the invention.

In one or more embodiments of the invention, at least one actuation device (154) is implemented as a physical device. The physical device may include circuitry that allows the physical device to perform the operations discussed above and/or other functionality without departing from the invention.

In one or more embodiments of the invention, the actuation devices (154) are components of one or more local data sources (152A, 152N). In another embodiment of the invention, the actuation device (154) may be external to the local data source but interact with the local data source(s) (152A, 152N) to perform or initiate operations on such local data sources. In another embodiment of the invention, the actuation device (154) may be external to the local data source and perform or initiate operations on a third device (not shown), where the third device is separate from the local data source and the actuation device. In another embodiment of the invention, the actuation device (154) may be external to the local data source and perform or initiate operations on third device (not shown), where the actuation device is located on the third device.

In one or more embodiments of the invention, the local data manager (160) is a device (e.g., a computing device as shown in FIG. 4) that manages data obtained from the local data sources (152). The local data manager (160) may manage the data by storing the data in internal storage (e.g., persistent storage (166)) or external storage and/or providing the data to external entities (e.g., clients). The local data manager (160) may include a DCF configuration daemon (162), a data ingestion manager (164), persistent storage (166), a rules engine (168), and a device pass-through service (170). The local data manager (160) may include additional, fewer, and/or different components without departing from the invention.

In one or more embodiments of the invention, the DCF configuration daemon (162) manages the configuration of components of the local data manger (160). Specifically, the DCF configuration daemon (162) configures the data ingestion manager (164) based on a DCF configuration file obtained from a data management system. The DCF configuration daemon (162) may configure the data ingestion manager (164) in accordance with the method of FIG. 2B. The DCF configuration daemon may configure the data ingestion manager (164), or other components of the local data manager (160), via other methods without departing from the invention.

In one or more embodiments of the invention, the DCF configuration daemon (162) is implemented as computing code stored on a persistent storage device (e.g., 166) that when executed by a processor of the local data manager (160) performs the functionality of the DCF configuration daemon (162). The processor may be a hardware processor including circuitry such as, for example, a central processing unit or a microcontroller. The processor may be other types of hardware devices for processing digital information without departing from the invention.

In one or more embodiments of the invention, the data ingestion manager (164) manages how unprocessed data is obtained (also referred to as ingested) from the local data sources (152). The data ingestion manager (164) may process the unprocessed data to generate processed data and store the processed data in accordance with a DCF pipeline. The DCF pipeline may be specified by a DCF configuration file used by the DCF configuration daemon to configure the data ingestion manager (164).

The persistent storage (166) may be configured to store data. The persistent storage (166) may be a physical storage. For example, the persistent storage (166) may include hard disk drives, solid state drives, and/or tape drives for storing data. The persistent storage (166) may include other types of non-transitory storage mediums without departing from the invention.

In one or more embodiments of the invention, the persistent storage (166) stores data obtained from the local data sources (152). The data stored in the persistent storage (166) may be provided to clients.

In one or more embodiments of the invention, the rules engine (168) analyzes ingested data to determine whether an actuation device (154) is to be modified. The rules engine (168) may obtain the data from the persistent storage (166), from a ledger service (e.g., 134, FIG. 1A), or from any other entity storing the ingested data. The rules engine (168) may apply a rules analysis to the data to determine whether the data specifies an actuation command is to be issued to an actuation device (154). The rules engine (168) may communicate with the device pass-through service (170) by sending actuation command requests to the device pass-through services to be issued to the actuation devices (154). The actuation command requests may specify the actuation commands as well as justification for the actuation command.

In one or more embodiments of the invention, the justification specified in the actuation command request may be based on confidence metadata associated with the data. The confidence metadata may be included (or otherwise specified) in the actuation command requests.

Figure 2A:
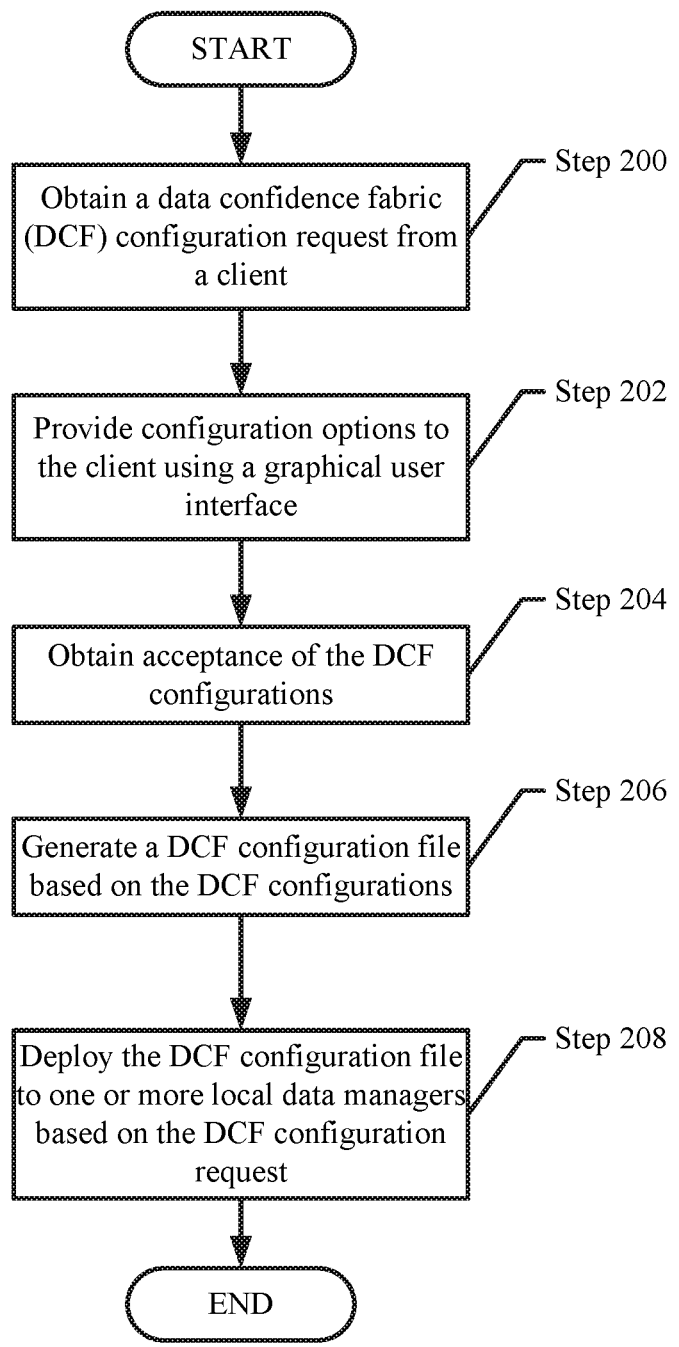
FIG. 2A shows a flowchart for managing a data confidence fabric configuration in accordance with one or more embodiments of the invention.
Figure 2B:
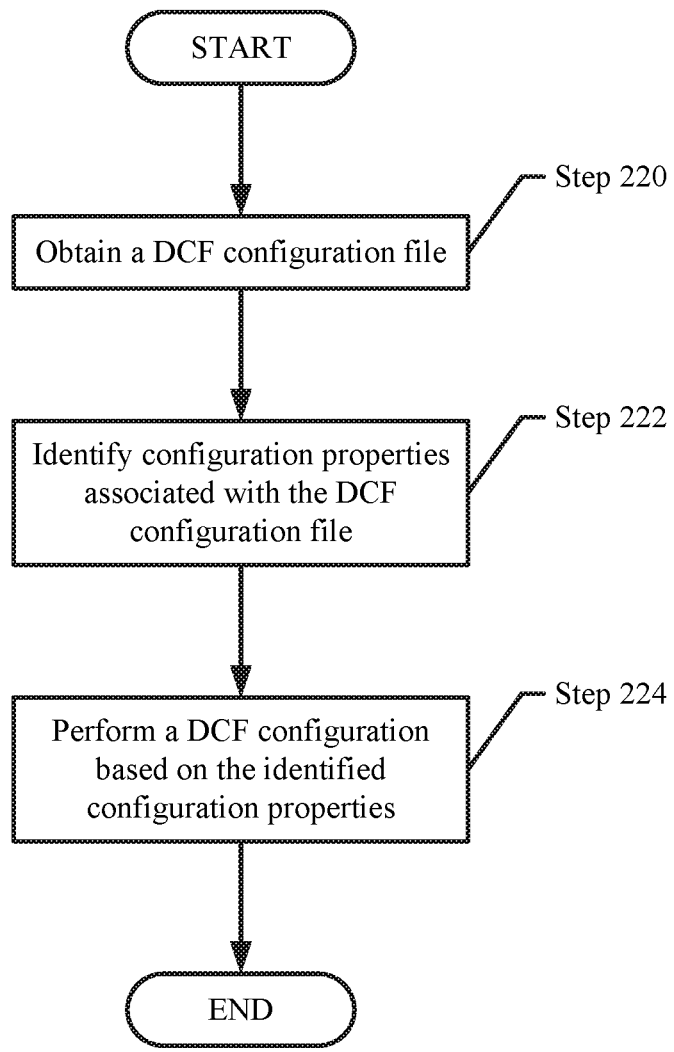
FIG. 2B shows a flowchart for configuring a local data manager in accordance with one or more embodiments of the invention.
Figure 2C:
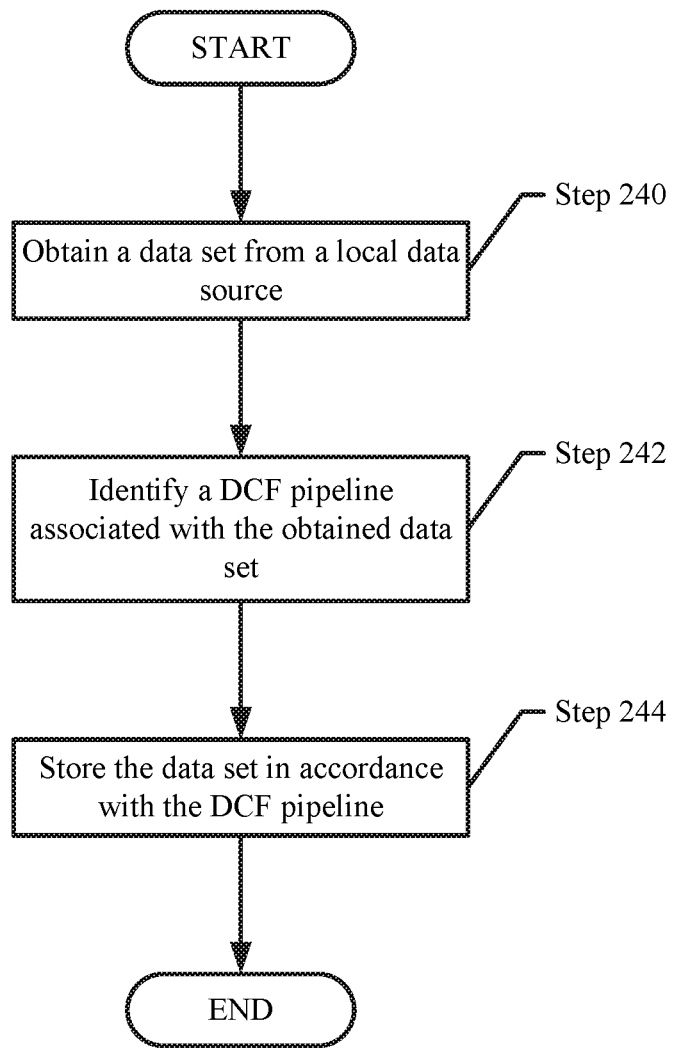
FIG. 2C shows a flowchart for performing data processing in accordance with one or more embodiments of the invention.
Figure 2D:
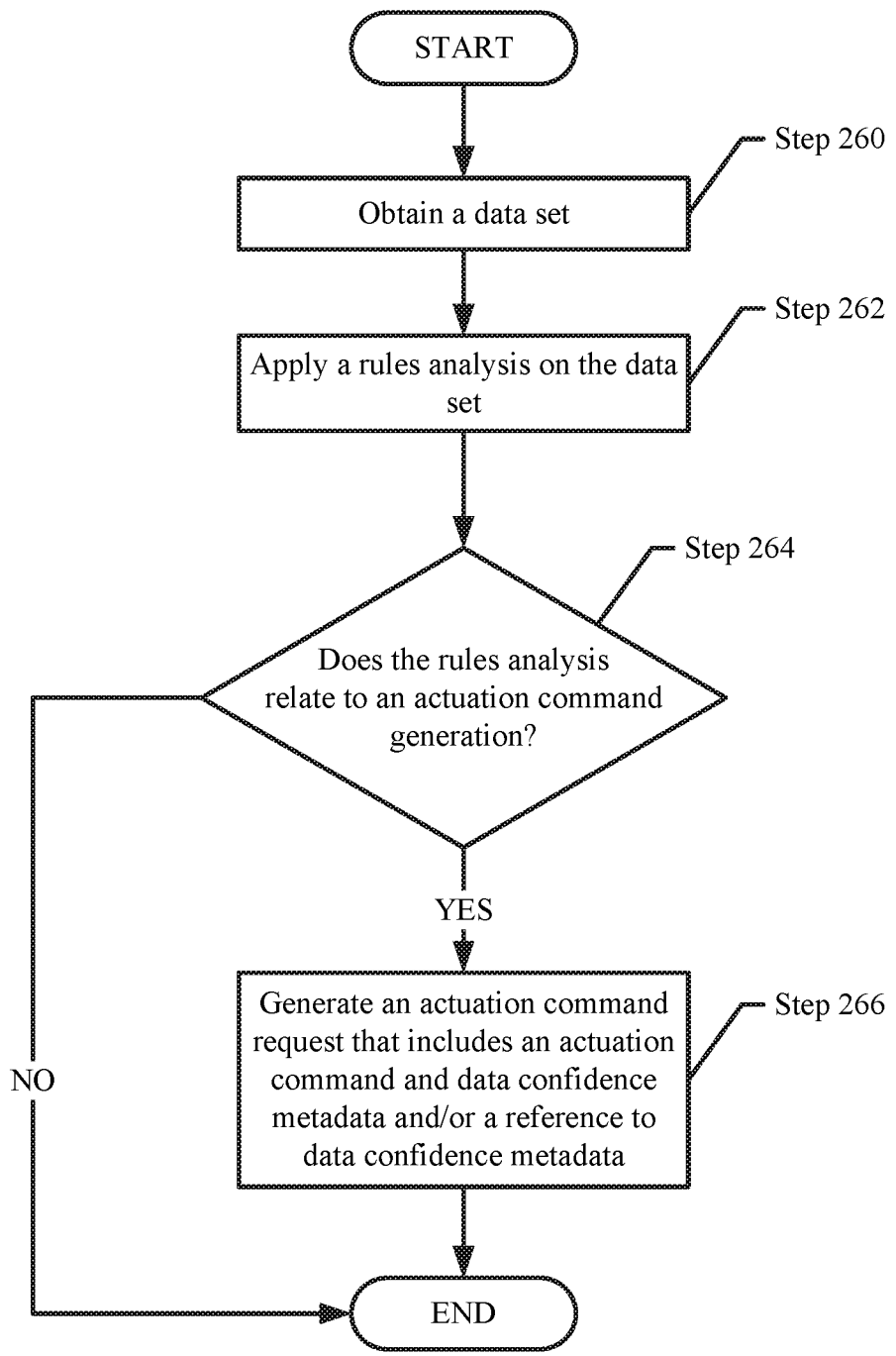
FIG. 2D shows a flowchart for monitoring data sets in accordance with one or more embodiments of the invention.

In one or more embodiments of the invention, the rules engine (168) is implemented as computing code stored on a persistent storage device (e.g., 166) that when executed by a processor of the local data manager (160) performs the functionality of the rules engine (168) discussed throughout this application and/or all, or a portion thereof, of the method illustrated in FIG. 2D. The processor may be a hardware processor including circuitry such as, for example, a central processing unit or a microcontroller. The processor may be other types of hardware devices for processing digital information without departing from the invention.

In one or more embodiments of the invention, the device pass-through service (170) manages actuation commands sent to the actuation devices (154). Specifically, the device pass-through service (170) obtains actuation command requests and processes the actuation command requests in accordance with FIG. 2E. The device pass-through may issue actuation commands to the actuation commands based on the processing of FIG. 2E.

In one or more embodiments of the invention, the device pass-through service (170) is a component of the data ingestion manager (164). In another embodiment of the invention, the device pass-through service (170) may be external to the data ingestion manager (164).

In one or more embodiments of the invention, an actuation command is intended to alter the behavior of the actuation devices (154). The actuation command may specify, for example, to reduce the rotational speed of a motor, to increase the temperature of an air conditioning unit, to turn on or off the actuation device, to calibrate and/or recalibrate sensors of an actuation device, and/or to modify any other behavior of the actuation devices without departing from the invention.

In one or more embodiments of the invention, the device pass-through service (170) is implemented as computing code stored on a persistent storage (e.g., 166) that when executed by a processor of the local data manager (160) performs the functionality of the device pass-through service (170). The processor may be a hardware processor including circuitry such as, for example, a central processing unit or a microcontroller. The processor may be other types of hardware devices for processing digital information without departing from the invention.

FIGS. 2A-2E show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2E may be performed in parallel with any other steps shown in FIGS. 2A-2E without departing from the scope of the invention.

FIG. 2A shows a flowchart for managing data confidence fabric configuration in accordance with one or more embodiments of the invention. The method shown in FIG. 2A may be performed by, for example, a data management system (100, FIG. 1A). Other components of the system illustrated in FIG. 1A may perform the method of FIG. 2A without departing from the invention.

Turning to FIG. 2A, in step 200, a DCF configuration request is obtained.

In one or more embodiments of the invention, the DCF configuration request is obtained by a DCF configurator of the data management system. The DCF configuration request may specify a request to configure one or more local data systems. In one or more embodiments of the invention, the DCF configuration request is obtained from a client. The DCF configuration request may specify the type of data to be processed (e.g., traffic data, temperature data, audio, etc.). Alternatively, the DCF configuration request may specify one or more local data systems.

In step 202, configuration options are provided to the client using a graphical user interface. In one or more embodiments of the invention, the DCF configuration options specify the options for configuring the local data systems. The options may be for augmenting the data, modifying the data, and/or storing the data. The DCF configuration options may be sent by the DCF configurator.

In one or more embodiments of the invention, the client makes a selection of the options using the GUI. The selection of the options may include all or a portion of the options provided by the data management system. The options may be displayed using categories based on the types of options for configuration. For example, a first category may be "Device Data" that displays options for configuring the type of data to be processed during data ingestion. A second category may be, for example, "Provenance Data" that displays options for configuring the generation of metadata associated with ingested data. A third category may be, for example, "Identity" that displays options for configuring the identification information of the obtained data. Additional categories may be displayed for additional options without departing from the invention.

In one embodiment of the invention, the GUI is provided to the client in response to the DCF configuration. In other words, the GUI is sent to the client to be used when selecting from the configuration options.

In one embodiment of the invention, access to the GUI is provided to the client. For example, a link (e.g., a hyperlink) to the GUI is sent to the client, and the GUI may be accessed by the client from the data management system.

Alternatively, the configuration options may be provided to the client using a non-graphical user interface such as, for example, a command line interface (CLI) or a hypertext transfer protocol (HTTP) interface. The client may communicate the selection using the corresponding non-graphical user interface.

In step 204, acceptance of the DCF configurations is obtained. In one or more embodiments of the invention, the acceptance includes the selection of the configuration options.

In step 206, a DCF configuration file is generated based on the DCF configurations. In one or more embodiments of the invention, the DCF configuration file is generated by obtaining a data structure that specifies the selection of options in a format that is readable by a DCF configuration daemon. The DCF configuration file may specify a DCF pipeline that specifies a process for modifying, augmenting, and/or storing data based on the selection of configuration options. The DCF configuration file may be generated by the DCF configurator.

In step 208, the DCF configuration file is deployed to one or more local data managers based on the DCF configuration request. In one or more embodiments of the invention, the DCF configuration file is deployed using a push deployment mechanism that includes sending the configuration file as a virtual container to one or more local data managers. The local data managers may be specified in the DCF configuration file. Alternatively, the DCF configuration file may specify a type of data, and the DCF configurator may identify one or more local data managers that obtain the type of data. The DCF configuration file may then be sent to the identified local data managers.

In one or more embodiments of the invention, the DCF configuration file is deployed using a decentralized deployment mechanism. The decentralized deployment mechanism may include generating a configuration file identifier associated with the DCF configuration file and providing the configuration file identifier, along with a minimum set of information that may be used by the local data managers to determine whether (or not) to request the DCF, to all (or a portion) of the local data management systems. Each local data manager may determine whether to obtain the DCF configuration file from the data management system in response to receiving the configuration file identifier (and the aforementioned accompanying information). If a local data manager determines that if should obtain the DCF, the local data may send a request that specifies the configuration file identifier to the data management system. The data management system subsequently sends the DCF configuration file to the local data manager.

FIG. 2B shows a flowchart for configuring a local data manager in accordance with one or more embodiments of the invention. The method shown in FIG. 2B may be performed by, for example, a local data manager (160, FIG. 1C). Other components of the system illustrated in FIG. 1A or FIG. 1C may perform the method of FIG. 2B without departing from the invention.

In step 220, a DCF configuration file is obtained. In one or more embodiments of the invention, the DCF configuration file is obtained based on the deployment mechanism of the data management system (as described above).

In step 222, configuration properties associated with the DCF configuration file are identified. The configuration properties may be identified using a DCF configuration daemon of the local data manager. In one or more embodiments of the invention, the configuration properties include each configuration options specified in the DCF configuration file. The DCF configuration daemon may analyze the DCF configuration file and identify each configuration property.

In one or more embodiments of the invention, each configuration property specifies a configuration for augmenting, modifying, and/or storing data obtained from one or more local data sources. The configuration property may specify the local data source and/or the type of data for which the local data manager is to process the data.

In step 224, a DCF configuration is performed based on the identified configuration properties. In one or more embodiments of the invention, the configuration is performed by selecting an identified configuration property and configuring a data ingestion manager to perform a process in accordance with the configuration property. For example, a configuration property may specify a digital signature to be generated for incoming traffic data. The DCF configuration daemon may configure the data ingestion manager to determine whether incoming data is traffic data and, if the incoming data is traffic data, to generate a signature of the incoming data. The process may be repeated for all identified configuration properties.

In one or more embodiments of the invention, the configuration is performed by generating a DCF pipeline based on the configuration properties. The DCF pipeline may be a process for processing incoming data in accordance with the configuration properties. The DCF pipeline may be associated with a type of data and/or a local data source. The DCF configuration daemon may subsequently configure the data ingestion manager to perform the DCF pipeline for associated data sets and/or associated local data sources.

In one embodiment of the invention, the local data manager may implement different DCF pipelines for different local data sources and/or the sample DCF pipeline for different local data sources.

FIG. 2C shows a flowchart for performing data processing in accordance with one or more embodiments of the invention. The method shown in FIG. 2C may be performed by, for example, a local data manager (160, FIG. 1C). Other components of the system illustrated in FIG. 1A or FIG. 1C may perform the method of FIG. 2C without departing from the invention.

In step 240, a data set (or data) is obtained from a local data source. The data set may be obtained by a data ingestion manager of the local data manager.

In step 242, a DCF pipeline is identified associated with the obtained data set. In one or more embodiments of the invention, the data ingestion manager may identify a type of data of the data set, the source of the data set (e.g., the local data source), and/or any other characteristics of the data set, and, using the aforementioned characteristics, identify a DCF pipeline that is associated with the data set. For example, if the obtained data set is an audio recording, the data ingestion manager may identify a DCF pipeline associated with audio data. In another example, the data set may be for a specific local data source (e.g., data obtained from a specific IoT device). In this scenario, the DCF pipeline for the specific IoT device is selected. In one embodiment of the invention, if there are multiple matching DCF pipelines for the data set, then (i) the most specific DCF pipeline is selected (i.e., the DCF pipeline that matches the greatest number of data set characteristics); (ii) the data is processed using all matching DCF pipelines, or (iii) local data manager may directly or indirectly request feedback from a client or the data management system to determine which DCF pipeline to use to process the data set.

In step 244, the data set is stored in accordance with the DCF pipeline(s).

In one or more embodiments of the invention, the local data manager performs the DCF pipeline to store the obtained data set. The data ingestion manager may perform the process of the DCF pipeline in the specified order. In one or more embodiments of the invention, the process includes augmenting the data, modifying the data, and/or storing the data. The data ingestion manager may augment the data, modify the data, and/or store the data in accordance with the DCF pipeline.

FIG. 2D shows a flowchart for monitoring data sets in accordance with one or more embodiments of the invention.

The method shown in FIG. 2D may be performed by, for example, a rules engine (168, FIG. 1C). Other components of the system illustrated in FIG. 1A or FIG. 1C may perform the method of FIG. 2D without departing from the invention.

In step 260, a data set (or data) is obtained. In one or more embodiments of the invention, the data is obtained from the local data manager, the ledger service, or from any other location that stores a copy of ingested data that is processed by the DCF pipeline.

In step 262, a rules analysis is applied on the data set. In one or more embodiments of the invention, the rules analysis includes identifying characteristics of the data set to determine whether an actuation command is to be initiated.

In one or more embodiments of the invention, the rules analysis includes analyzing the values of one or more data points in the data set and comparing the values to previously-obtained values of data sets obtained from the same local data source and determining whether there is a significant difference in the values.

In one or more embodiments of the invention, the rules analysis includes identifying a threshold based on a policy associated with an actuation device and/or a local data source and determining whether one or more data points of the data set satisfy the threshold. For example, a data set may be associated with rotation speed of a motor, measured in rotations per minute (RPM). A policy may specify that a rotational speed above 5,000 RPM triggers an actuation command to be sent to the motor to trigger a reduction in speed. The data ingestion manager implementing the policy may identify a data point that specifies the rotational speed of the motor at 5,500 RPM at a point in time.

In one or more embodiments of the invention, the rules analysis results in a determination that an actuation command is to be issued.

In step 264, a determination is made about whether the rules analysis relates to an actuation command generation. If the rules analysis relates to an actuation command generation, the method proceeds to step 266; otherwise, the method ends following step 264.

In step 266, in response to the determination of step 264, an actuation command request is generated. The actuation command request may include an actuation command and, confidence metadata associated with the actuation command and/or a reference to the confidence metadata. The actuation command request may include other information without departing from the invention.

In one or more embodiments of the invention, the confidence metadata (or reference to confidence metadata) that is included in the actuation command request specifies information that is useful for determining a validity of the actuation command. The confidence metadata may include, for example, the origin of the data set, any encryption information applied to the data set to ensure secure storage of the data set, any licensing information (e.g., an owner of the data set), and/or any other information that may be used by a device pass-through service when evaluating the actuation command request to determine the validity of the actuation command request.

In one or more embodiments of the invention, the rules engine determines whether to include the confidence metadata (either all or a portion thereof) in the actuation command request or to include a reference to the confidence metadata. The determination may be based on a policy that specifies conditions that are to be met in order for the confidence metadata to be embedded or referenced in the actuation command request. For example, a policy may specify a network bandwidth threshold between the local data manager and the object storage, which is used to determine when to include a reference to the confidence metadata. As a second example, a policy may reference a maximum amount of confidence metadata that may be included within the actuation command request, above which only a reference to the confidence metadata may be included in the actuation command request.

In one or more embodiments of the invention, if the rules engine determines to include the confidence metadata (as opposed to only referencing the confidence metadata) in the actuation command request, the rules engine (or another entity) may obtain the confidence metadata from a location in which the confidence metadata is stored (e.g., an object storage) and make a copy of all or a portion of the confidence metadata associated with the data set and embed the copy in the actuation command request.

Figure 2E:
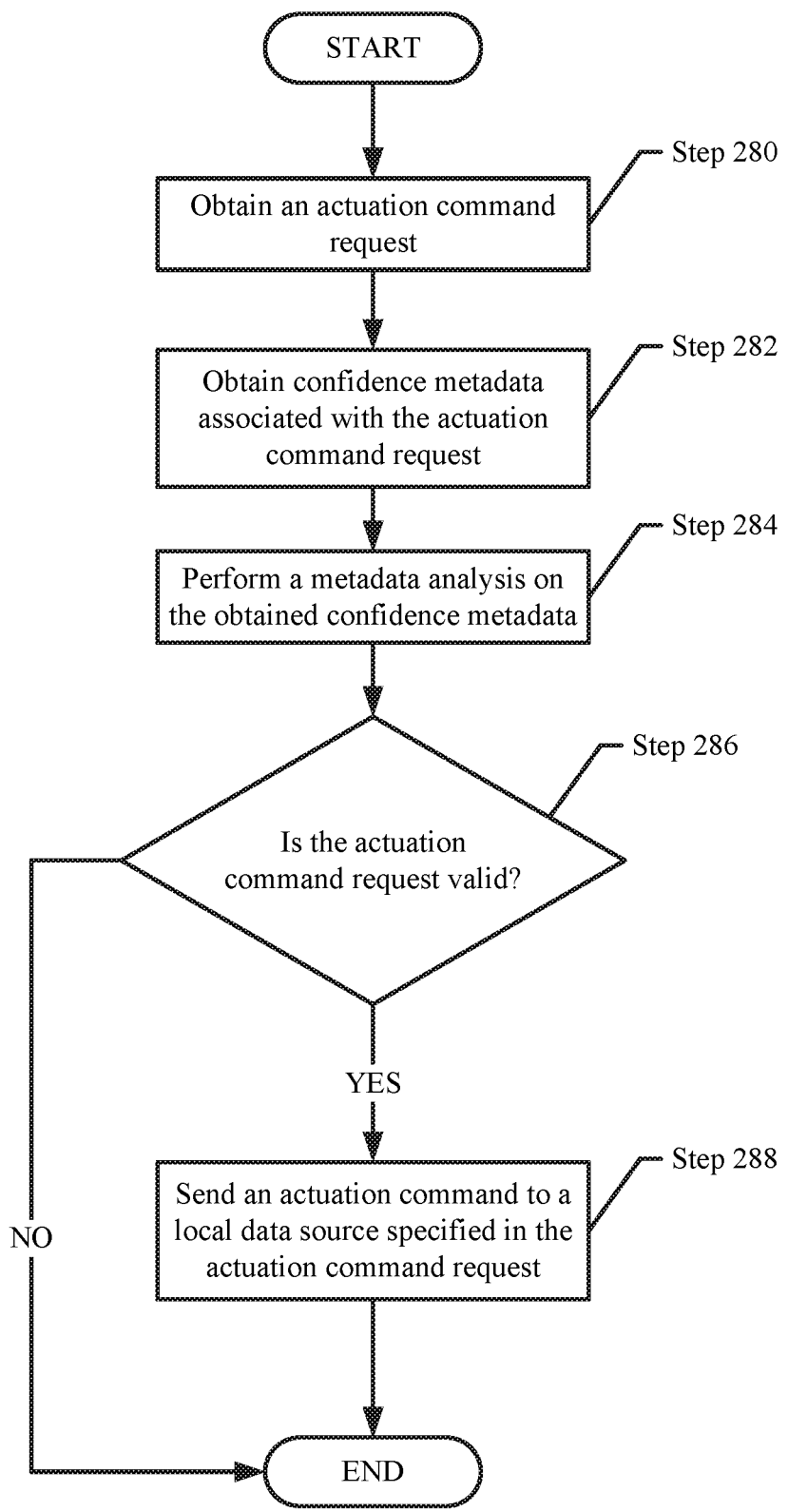
FIG. 2E shows a flowchart for processing an actuation command request in accordance with one or more embodiments of the invention.

FIG. 2E shows a flowchart for processing an actuation command request in accordance with one or more embodiments of the invention. The method shown in FIG. 2E may be performed by, for example, a device pass-through service (166, FIG. 1B). Other components of the system illustrated in FIG. 1A or FIG. 1B may perform the method of FIG. 2E without departing from the invention.

In step 280, an actuation command request is obtained. In one or more embodiments of the invention, the actuation command request includes an actuation command to be issued to an actuation device. The actuation command may specify an action to be performed by the actuation device. For example, the actuation command may specify to power on or power off a device, to modify a speed of a motor, to adjust temperature of a heating/cooling device, etc. The actuation command may specify other commands without departing from the invention.

In one or more embodiments of the invention, the actuation command request includes confidence metadata. The confidence metadata may be embedded in the actuation command request.

In one or more embodiments of the invention, the confidence metadata is referenced in the actuation command request. In such embodiments, the actuation command request may include, for example, a fingerprint and/or location information that specifies how to obtain the confidence metadata (i.e., where the confidence metadata is stored).

In step 282, confidence metadata associated with the actuation command request is obtained. In one or more embodiments of the invention, if the confidence metadata is embedded in the actuation command request, the confidence metadata is obtained from the actuation command request.

In other embodiments where the confidence metadata is only referenced in the actuation command request, the confidence metadata may be obtained using the reference. The actuation command request may specify a storage location of the confidence metadata. The confidence metadata may be stored in, for example, memory of the device pass-through service, persistent storage of the local data manager, an external device operatively connected to the local data manager (e.g., a storage device of an object storage) and accessed using a hyperlink, a trusted execution environment (e.g., a storage environment with an operating system that is enhanced to provide increased confidential protection), and/or any other storage location without departing from the invention.

In step 284, a metadata analysis is performed on the obtained confidence metadata. In one or more embodiments of the invention, the metadata analysis includes analyzing the confidence metadata to determine whether the actuation command is valid.

In one or more embodiments of the invention, prior to the metadata analysis, the actuation command is evaluated to determine a severity of the actuation command. The severity may be a measurement for how much the actuation command will affect the specified actuation device and/or the environment in which the actuation device is operating. The severity may be determined by identifying a type of actuation command. This may include, for example, whether the actuation command specifies powering on or off a device (higher severity) or if the actuation command specifies adjusting an action of a component of the actuation device (lower severity).

In one or more embodiments of the invention, the severity of the actuation command is used to determine a series of one or more metadata conditions for the confidence metadata to meet in order to accept the actuation command. For example, a higher severity may specify requiring a higher level of confidence metadata (e.g., an encrypted data set, a high confidence score, etc.) to be associated with the actuation command in order for the actuation command to be deemed valid by the device pass-through service.

Returning to the description of step 284, in one or more embodiments of the invention, the content of the confidence metadata is analyzed by comparing the content to the series of metadata conditions. For example, the series of metadata conditions may specify a confidence score of 80 or above and a specified owner of the data set associated with the confidence metadata in order for the actuation command request to be valid. The device pass-through service may analyze the confidence metadata to determine the confidence score and whether an owner is specified and make a determination of the validity based on the analysis.

In step 286, a determination is made about whether the actuation command request is valid. The determination is made based on the metadata analysis. If the actuation command request is valid, the method proceeds to step 288; otherwise, the method ends following step 286 and the actuation command is not issued to the actuation device.

In one or more embodiments of the invention, after the device pass-through services makes the aforementioned determination, an entry is generated and stored in an audit log based on the determination. The audit log may be stored in the device pass-through service, the ledger service, and/or any other component without departing from the invention. The entry may specify the determination and/or a reason for which the actuation command was deemed valid or invalid.

In step 288, an actuation command is sent to the actuation device specified in the actuation command request. In one or more embodiments of the invention, the actuation command prompts an actuation device to perform a function based on the actuation command request.

EXAMPLE

Figure 3A:
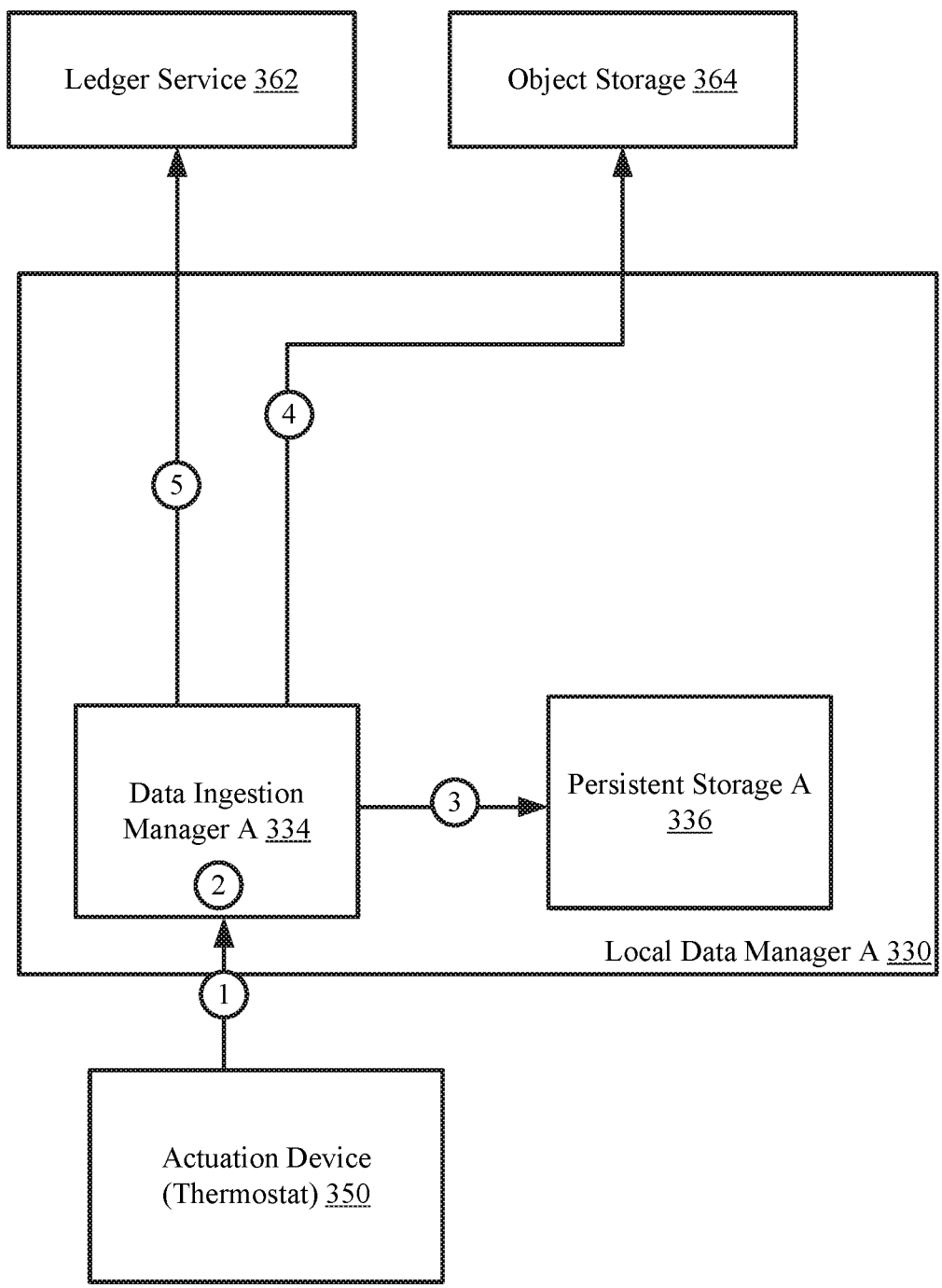
FIGS. 3A-3B show an example in accordance with one or more embodiments of the invention.
Figure 3B:
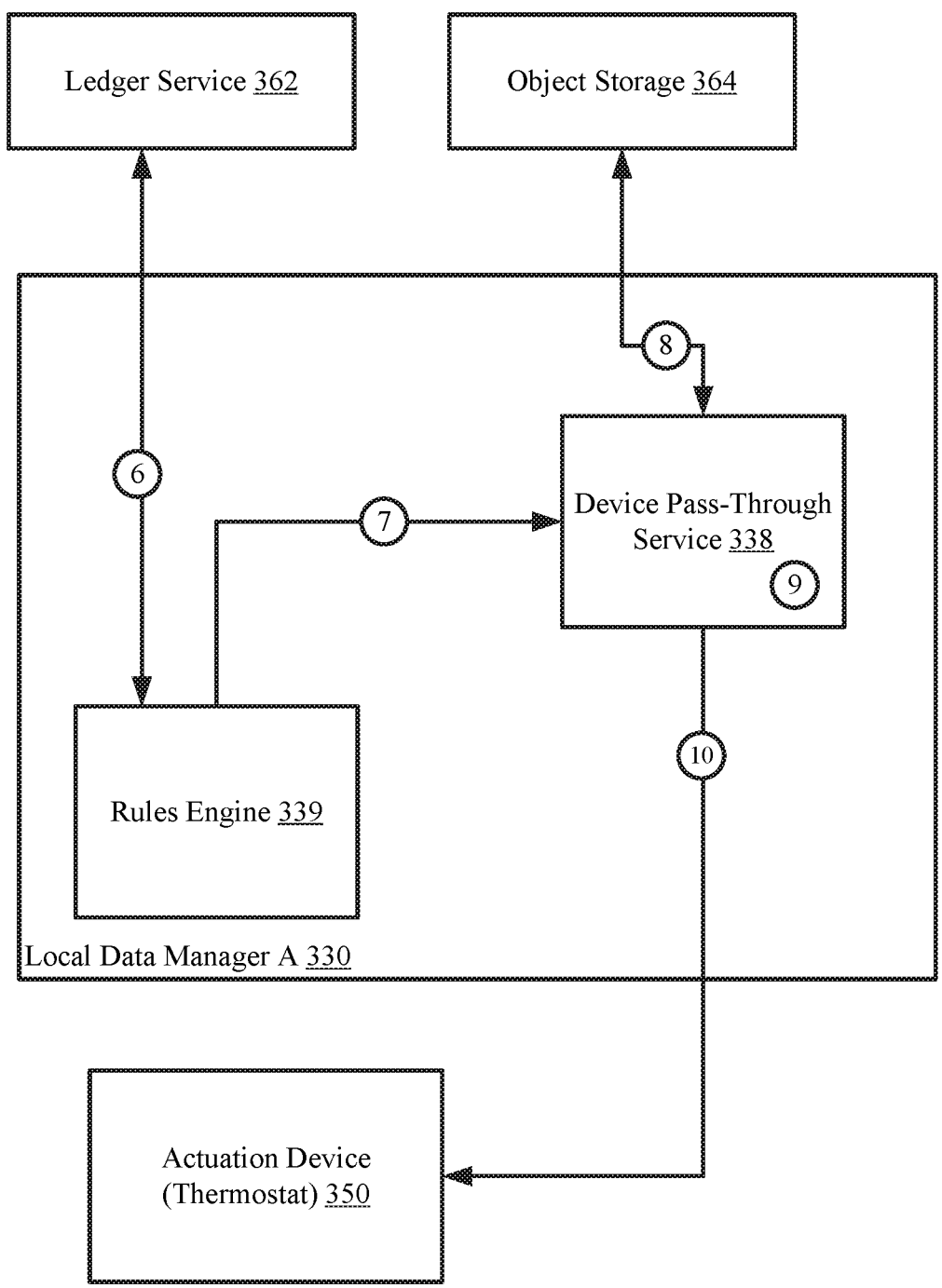

The following section describes an example. The example, illustrated in FIGS. 3A-3B, is not intended to limit the invention. Turning to the example, consider a scenario in which data from an actuation device is obtained and managed.

FIG. 3A shows an example system in accordance with one or more embodiments of the invention. For the sake of brevity, not all components of the example system may be illustrated. The system includes a local data manager (330), a thermostat that serves as a local data source and an actuation device (350) (i.e., it controls an air conditioning unit), a ledger service (362) and an object storage (364).

The thermostat (350) sends a data set to a data ingestion manager (334) [1]. The data set relates to the temperature of a room during several points in an hour. The data ingestion manager performs the method of FIG. 2C to store the data set [2]. Specifically, the data ingestion manager (334) performs a DCF pipeline as configured by a configuration file. The DCF pipeline specifies generating metadata associated with the thermostat (350) and storing the data and the metadata in an object storage (364) as well as a reference to the metadata in a ledger service (362). The metadata specifies the thermostat (350), the owner of the thermostat (350) and any other data associated with the thermostat (350), and a most recent time the thermostat (350) was calibrated.

The data ingestion manager stores the data set in a persistent storage (336) of the local data manager (330) [3]. Further, the data ingestion manager (334), implementing the DCF pipeline, stores the data and the metadata in the object storage (364) [4]. Further, the data ingestion manager generates a reference to the metadata and stores the reference in the ledger service (362) [5].

At a later point in time, the data set is analyzed to determine whether an actuation command is to be issued. FIG. 3B shows a diagram of the example system at the later point in time. In FIG. 3B, a rules engine (339) operating on the local data manager (330) obtains the reference to the metadata from a ledger service (362) and performs a rules analysis on the data set to determine whether an actuation command is to be generated [6]. The rules analysis specifies a threshold temperature of 30 degrees Celsius to be exceeded for an actuation command to lower the temperature to be issued. The rules engine (339) analyzes the data set and identifies a temperature range of 32-34 degrees Celsius for several data points in the data set.

The rules engine (339), based on the rules analysis, determines that an actuation command is to be issued that prompts the thermostat (350) to initiate the air condition unit to turn on in order to lower the temperature in the room. The rules engine (339) sends an actuation command request to a device pass-through service (338) of the local data manager (330) [7]. The actuation command request includes the actuation command (which specifies lowering the temperature to 25 degrees Celsius) and a reference to the data set confidence metadata to be used to justify the actuation command.

The device pass-through service (338) obtains the actuation command request, identifies the confidence metadata stored in the object storage (364) and obtains the confidence metadata [8]. The device pass-through service (338) performs the method of FIG. 2E to process the actuation command request [9]. Specifically, the device pass-through service (338) may determine a severity of the actuation command by analyzing the content of the actuation command Because the actuation command only specifies a minor temperature change, the actuation command is determined to be of low severity. Based on this determination, the device pass-through service assigns a condition that the actuation command request is valid when the owner of the data set is specified in the confidence metadata.

The device pass-through service (338) further performs the method of FIG. 2E by performing a metadata analysis to determine a validity of the actuation command request. The metadata analysis may include analyzing the confidence metadata to determine whether the confidence metadata satisfies the condition of including the owner of the data set. Because the confidence metadata specifies the owner of the thermostat (350) and any data associated with it, the device pass-through service (338) determines that the actuation command request is valid.

In response to the determination that the actuation command request is valid, the device pass-through service (338) issues the actuation command to the actuation device (350) (i.e., the thermostat) [10]. The actuation device (350) may perform the actuation command (i.e., activate an air conditioning unit in the room) to reduce the temperature of the room to 25 degrees Celsius.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of servicing actuation commands by enhancing actuation command requests with confidence metadata and managing a device pass-through service to analyze the confidence metadata to determine a validity of the actuation command requests. The metadata analysis may reduce the attempts from malicious entities to issue undesirable actuation commands without justifying the reason for such actuation commands.

Further, embodiments of the invention evaluate the reliability of the data that is used to justify an actuation command using the confidence metadata even if the actuation command is not issued with malicious intent. This allows the local data system to confirm that an actuation command is truly warranted as opposed to using erroneous data to justify the actuation command. In this manner, the integrity of a local data system is maintained by filtering out the malicious and/or erroneous requests.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
   obtaining, by a local data manager, an actuation command request;
   evaluating the actuation command request to determine a severity of the actuation command request, wherein the severity of the actuation command request is used to determine at least one metadata condition that confidence metadata must satisfy in order for the actuation command request to be valid;
   performing a metadata analysis on the confidence metadata associated with the actuation command request, wherein the metadata analysis is based on the at least one metadata condition;
   making, based on the metadata analysis, a determination that the actuation command request is valid; and
   in response to the determination, sending an actuation command to an actuation device based on the actuation command request,
   wherein the actuation command specifies at least performing an operation,
   wherein the operation comprises initiation of a cooling or heating device.

2. The method of claim 1, further comprising:
   obtaining, by the local data manager, a data set from the actuation device;
   identifying a DCF pipeline, wherein the DCF pipeline specifies a process for storing the data set; and
   storing the data set based on the DCF pipeline.

3. The method of claim 2, wherein the process for storing the data set comprises at least one of: storing a copy of the data set in an object storage, generating confidence metadata and storing a copy of the confidence metadata in the object storage, or generating a ledger entry associated with the data set.

4. The method of claim 1, wherein the actuation command request comprises the actuation command and an actuation device identifier associated with the actuation device.

5. The method of claim 4, wherein the actuation command request further comprises at least one of: at least a portion of the confidence metadata and a reference to the confidence metadata.

6. The method of claim 1, wherein the confidence metadata comprises a confidence score.

7. The method of claim 1, wherein performing the metadata analysis comprises:
   analyzing the actuation command to determine a confidence metadata criterion;

obtaining the confidence metadata; and making a second determination that the confidence metadata meets the confidence metadata criterion.

8. A non-transitory computer readable medium comprising computer readable program code, which when executed by a computer processor enables the computer processor to perform a method, the method comprising:

obtaining, by a local data manager, an actuation command request;

evaluating the actuation command request to determine a severity of the actuation command request, wherein the severity of the actuation command request is used to determine at least one metadata condition that confidence metadata must satisfy in order for the actuation command request to be valid;

performing a metadata analysis on the confidence metadata associated with the actuation command request, wherein the metadata analysis is based on the at least one metadata condition;

making, based on the metadata analysis, a determination that the actuation command request is valid; and in response to the determination, sending an actuation command to an actuation device based on the actuation command request, wherein the actuation command specifies at least performing an operation, wherein the operation comprises initiation of a cooling or heating device.

9. The non-transitory computer readable medium of claim 8, the method further comprising:

obtaining, by the local data manager, a data set from the actuation device;

identifying a DCF pipeline, wherein the DCF pipeline specifies a process for storing the data set; and storing the data set based on the DCF pipeline.

10. The non-transitory computer readable medium of claim 9, wherein the process for storing the data set comprises at least one of: storing a copy of the data set in an object storage, generating confidence metadata and storing a copy of the confidence metadata in the object storage, or generating a ledger entry associated with the data set.

11. The non-transitory computer readable medium of claim 8, wherein the actuation command request comprises the actuation command and an actuation device identifier associated with the actuation device.

12. The non-transitory computer readable medium of claim 11, wherein the actuation command request further comprises at least one of: at least a portion of the confidence metadata and a reference to the confidence metadata.

13. The non-transitory computer readable medium of claim 8, wherein the confidence metadata comprises a confidence score.

14. The non-transitory computer readable medium of claim 8, wherein performing the metadata analysis comprises:

analyzing the actuation command to determine a confidence metadata criterion;

obtaining the confidence metadata; and making a second determination that the confidence metadata meets the confidence metadata criterion.

15. A system, comprising:

a processor;

memory comprising instructions, which when executed by the processor, perform a method, the method comprising:

obtaining, by a local data manager, an actuation command request;

evaluating the actuation command request to determine a severity of the actuation command request, wherein the severity of the actuation command request is used to determine at least one metadata condition that confidence metadata must satisfy in order for the actuation command request to be valid;

performing a metadata analysis on the confidence metadata associated with the actuation command request, wherein the metadata analysis is based on the at least one metadata condition;

making, based on the metadata analysis, a determination that the actuation command request is valid; and in response to the determination, sending an actuation command to an actuation device based on the actuation command request, wherein the actuation command specifies at least performing an operation, wherein the operation comprises initiation of a cooling or heating device.

16. The system of claim 15, the method further comprising:

obtaining, by the local data manager, a data set from the actuation device;

identifying a DCF pipeline, wherein the DCF pipeline specifies a process for storing the data set; and storing the data set based on the DCF pipeline.

17. The system of claim 16, wherein the process for storing the data set comprises at least one of: storing a copy of the data set in an object storage, generating confidence metadata and storing a copy of the confidence metadata in the object storage, or generating a ledger entry associated with the data set.

18. The system of claim 15, wherein the actuation command request comprises the actuation command and an actuation device identifier associated with the actuation device.

19. The system of claim 18, wherein the actuation command request further comprises at least one of: at least a portion of the confidence metadata and a reference to the confidence metadata.

20. The system of claim 15, wherein performing the metadata analysis comprises:

analyzing the actuation command to determine a confidence metadata criterion;

obtaining the confidence metadata; and making a second determination that the confidence metadata meets the confidence metadata criterion.

* * * * *